C. SHUNK.

Refining Iron and Steel.

No. 798. Reissued Aug. 16, 1859.

Witnesses:

A. B. Stoughton

Thos. Upperman

Inventor:

Christian Shunk.

UNITED STATES PATENT OFFICE.

CHRISTIAN SHUNK, OF CANTON, OHIO.

IMPROVEMENT IN REFINING IRON IN THE HEARTH OF A BLAST-FURNACE.

Specification forming part of Letters Patent No. 24,060, dated May 17, 1859; Reissue No. 798, dated August 16, 1859.

*To all whom it may concern:*

Be it known that I, CHRISTIAN SHUNK, of Canton, in the county of Stark and State of Ohio, (formerly of Slate Lick, in the county of Armstrong and State of Pennsylvania,) have invented a new and useful improvement in the process of refining and decarbonizing the melted metal in the hearth of the ordinary blast-furnace used in the manufacture of pig-metal; and I do hereby declare the following to be a full, clear, and exact description thereof, reference being had to the accompanying drawings, making a part of this specification and illustrative of the same, in which—

Figure 1:
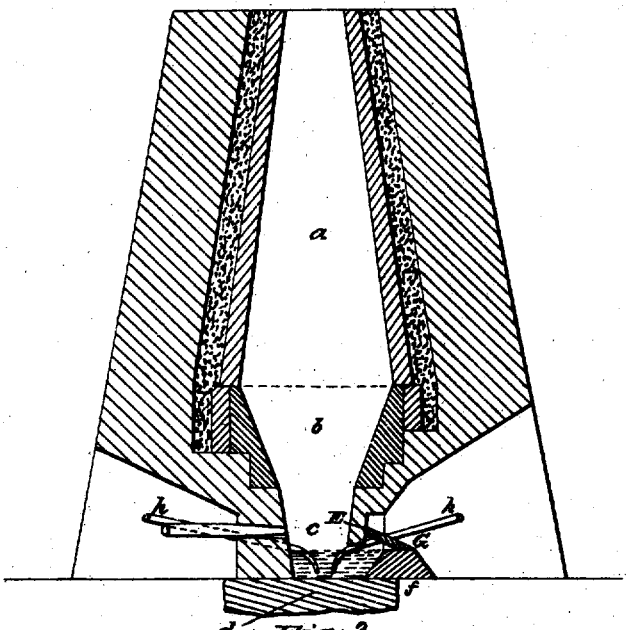
Figure 2:
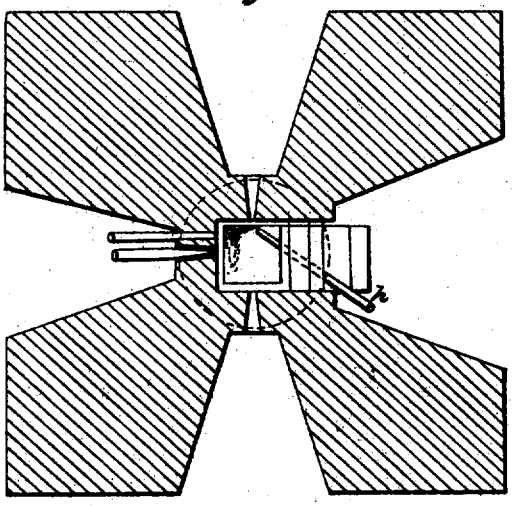

Figure 1 represents a vertical section through the stack, tamp-arch, and one of the tuyere-arches of an ordinary blast-furnace for the manufacture of pig-iron from the ore and as constructed and arranged for the use of my improved process. Fig. 2 is a horizontal section through the tuyere-arches and hearth of the blast-furnace. (Shown in Fig. 1.)

Similar letters of reference, where they occur in the separate figures, refer to like parts in both of them.

My improvement consists in refining and decarbonizing the melted metal in the hearth of the blast-furnace before it leaves the hearth by passing a blast or blasts of air through the body of the molten metal by means of an auxiliary tuyere pipe or pipes, so arranged as to discharge the blast under the surface of the melted metal and give to it a rapid rotary motion therein, and thus insure a free admixture of the oxygen of the air thus blown in with the particles of the iron, causing the union of the carbon in the iron with the oxygen thus supplied, and so refining the metal before it is made into pig-iron.

My invention supersedes entirely the use of the finery or run-out fire, the use of which arose from the necessity of an intermediate process of refining or purification between the blast-furnace where the ore is converted into metallic iron and the puddling-furnace, this necessity being occasioned by the impurities in the iron and the presence of an excess of carbon. My invention thus not only avoids the trouble and delay of this intermediate process, but causes a great saving of iron, which is usually converted into slag and wasted by the finery or the run-out process, as well as a saving of the fuel used in the remelting of the pig.

To enable others skilled in the art to make and use my invention, I will proceed to describe the same by reference to the drawings.

The furnace itself is constructed, like other blast-furnaces, in the shape and position of the upper part or crucible, *a*, the middle portion or boshes, *b*, and the lower part or hearth, *c*, the only alteration required being the formation of one or more additional tuyere-holes for the admission of the auxiliary tuyere pipe or pipes used for introducing the blast into the iron. The ordinary tuyere pipes used in the blast-furnaces are not dispensed with, nor is their position or mode of application necessarily varied, excepting that when the refining process is being carried on all the blast is caused to pass through the auxiliary tuyere pipe or pipes, and is shut off or stopped from passing through the ordinary tuyere-pipes.

To introduce the blast for refining the iron by my process I use a separate and independent tuyere pipe, which is introduced into the hearth of the furnace under the tamp-stone in front or at one of the sides, as may be preferred. If it be introduced at one of the sides, it is inserted through a tuyere arch in a manner similar to the ordinary tuyere-pipes, excepting that the nozzle of the auxiliary tuyere-pipe is much longer and enters into the hearth, which the nozzle of the ordinary tuyere-pipe does not. The nozzle of the auxiliary tuyere-pipe, after entering the cavity forming the hearth, dips downward to within a short distance of the hearthstone *d*, so that its mouth is covered by the molten metal. It is preferable to set the nozzle of the auxiliary tuyere-pipe at such an angle as that the blast of air entering the iron may strike the wall of the hearth at (as nearly as possible) a line tangential to a circle drawn therein, so as to expend its force more effectually in causing the molten metal to rotate in the hearth and to become more diffused through it, as every particle of iron thus moved around must come in contact with the blast of air and a more certain commingling of them produced. The rotary motion thus given to the molten metal in the hearth greatly relieves the pressure against the incoming blast, as the motion of the metal is in the same direction in which the blast enters, and the force of the blast is cumulative on the iron when the latter is once set in motion. The auxiliary tuyere *h*, as shown in Fig. 2, is represented as being rather a chord or secant of the circle drawn within the hearth than a tangent, but that is about the right inclination to effect a rapid rotation of the metal in the hearth. If the auxiliary tuyere-pipe is to be introduced in front of the furnace, it is done by inserting it through the small opening between the lower front edge of the tamp-stone E and the top of the dam-stone *f*, in which case a movable tamp-plate, G, is placed over the dam *f*, covering the aperture between the tamp-stone and the dam-stone. The auxiliary pipe is inserted in an opening of convenient size in said plate G, so as to penetrate the liquid metal near the bottom of the furnace-hearth, and this plate may be swung out of the way when the refining process is over.

It will thus be seen that my improvement, though very important in its results, requires so little alteration in the construction and arrangement of the ordinary blast-furnace as to be easily and cheaply introduced into practical operation. But I do not desire to confine myself in the application of my improvement to the precise manner of application herein described so long as the molten metal is rapidly moved around in the hearth.

After the charge of iron has run down into the hearth of the blast-furnace, (the smelting process being carried on in the usual way,) and when the molten metal is ready, according to the ordinary process, to be run out into pigs, my refining process is commenced. The auxiliary tuyere pipe or pipes are now introduced into the molten iron, and the whole blast of air used for the blast-furnace is now diverted from the ordinary tuyere-pipes and caused to pass with great force and pressure through the auxiliary tuyere pipe or pipes *h h* used in my process. Cold air is much preferable as a blast for refining the iron, though either cold or hot may be used. Care must be taken to proportion the size of the auxiliary tuyere-pipes to the quantity of air to be forced through them by the blowing-cylinders, which must be very considerable in volume and pressure to cause a rapid motion and ebullition of the molten iron in the furnace-hearth, so as to expose all the particles of the iron to contact with the air, by means of which the iron is refined of its impurities and decarbonized by the admixture of the oxygen of the air and the carbon in the iron before it is run into pig-metal.

The process of refining requires but a few minutes for its accomplishment, and when finished the molten metal is drawn off through the tapping-hole in the usual manner and molded into pig-iron.

The use of a strong blast of cold air and its intimate admixture with the molten iron has not the effect of chilling the iron in the furnace-hearth, but rather the reverse, as the chemical effect of the union of the oxygen and carbon is to produce an intense heat, which preserves, and, if anything, increases, the fluidity of the metal; but this cold blast must not be continued too long, for, if so, the iron will commence to granulate. The proper time is soon learned by the workman by the appearance of the metal to the eye, which is the only reliable way of determining its condition in its various stages of manufacture.

Having thus fully described the nature and object of my invention, I would state that I do not broadly claim the introduction of atmospheric air into molten metal regardless of of the manner of doing it; but—

What I do claim as new in the manufacture of pig-iron from the ore, and desire to secure by Letters Patent, is—

The employment immediately before the tapping of the furnace of an auxiliary tuyere pipe or pipes within the hearth of the common blast-furnace when charged with molten iron at such an inclination as to cause the blast of air to commingle with the particles of iron and give to the whole mass in the hearth a spiral or rotary motion, substantially as described.

CHRISTIAN SHUNK.

Witnesses:
W. A. WOLFERSBERGER,
CHAS. F. HELFFRICHT.